United States Patent
Fei et al.

(10) Patent No.: US 12,147,497 B2
(45) Date of Patent: Nov. 19, 2024

(54) SYSTEMS AND METHODS FOR CROSS-LINGUAL CROSS-MODAL TRAINING FOR MULTIMODAL RETRIEVAL

(71) Applicant: Baidu USA, LLC, Sunnyvale, CA (US)

(72) Inventors: Hongliang Fei, Sunnyvale, CA (US); Tan Yu, Bellevue, WA (US); Ping Li, Bellevue, WA (US)

(73) Assignee: Baidu USA LLC

( * ) Notice: Subject to any disclaimer, the term of this patent is extended or adjusted under 35 U.S.C. 154(b) by 464 days.

(21) Appl. No.: 17/715,804

(22) Filed: Apr. 7, 2022

(65) Prior Publication Data
US 2022/0383048 A1 Dec. 1, 2022

Related U.S. Application Data

(60) Provisional application No. 63/190,667, filed on May 19, 2021.

(51) Int. Cl.
*G06F 18/214* (2023.01)
*G06F 40/20* (2020.01)
(Continued)

(52) U.S. Cl.
CPC .......... *G06F 18/2148* (2023.01); *G06F 40/20* (2020.01); *G06F 40/51* (2020.01); *G06N 5/022* (2013.01)

(58) Field of Classification Search
CPC ...... G06F 18/2148; G06F 40/20; G06F 40/51; G06F 40/216; G06F 40/284; G06F 40/44;
(Continued)

(56) References Cited

U.S. PATENT DOCUMENTS 9,715,660 B2 * 7/2017 Parada San Martin .. G06N 7/01
10,789,431 B2 * 9/2020 Gubanov ................ G06F 40/44
(Continued)

FOREIGN PATENT DOCUMENTS

CN 115374798 A * 11/2022 ............ G06F 40/20

OTHER PUBLICATIONS

Anderson et al., "Bottom-up and top-down attention for image captioning and visual question answering," In Proceedings of the 2018 IEEE Conference on Computer Vision & Pattern Recognition (CVPR), 2018. (10pgs).
(Continued)

*Primary Examiner* — Solomon G Bezuayehu
(74) *Attorney, Agent, or Firm* — Oppedahl Patent Law Firm LLC

(57) ABSTRACT

Current pretrained vision-language models for cross-modal retrieval tasks in English depend upon on the availability of many annotated image-caption datasets for pretraining to have English text. However, the texts are not necessarily in English. Although machine translation (MT) tools may be used to translate text to English, the performance largely relies on MT's quality and may suffer from high latency problems in real-world applications. Embodiments herein address these problems by learning cross-lingual cross-modal representations for matching images and their relevant captions in multiple languages. Embodiments seamlessly combine cross-lingual pretraining objectives and cross-modal pretraining objectives in a unified framework to learn image and text in a joint embedding space from available English image-caption data, monolingual corpus, and parallel corpus. Embodiments are shown to achieve state-of-the-art performance in retrieval tasks on multimodal multilingual image caption datasets.

20 Claims, 11 Drawing Sheets

(51) Int. Cl.
*G06F 40/51* (2020.01)
*G06N 5/022* (2023.01)
(58) Field of Classification Search
CPC ......... G06F 40/30; G06F 40/58; G06N 5/022; G06N 3/045; G06N 3/084; G06V 10/774; G06V 10/82
See application file for complete search history.

(56) References Cited

U.S. PATENT DOCUMENTS

| | | | | |
|---|---|---|---|---|
| 11,003,867 | B2* | 5/2021 | Singh | G06F 40/51 |
| 12,045,592 | B2* | 7/2024 | Clement | G06N 3/084 |
| 2018/0108165 | A1* | 4/2018 | Shi | G06N 3/084 |
| 2020/0226410 | A1* | 7/2020 | Liu | G06V 30/153 |
| 2020/0342236 | A1* | 10/2020 | Gong | G06F 18/217 |
| 2022/0044671 | A1* | 2/2022 | Kapoor | G10L 15/063 |
| 2022/0084510 | A1* | 3/2022 | Peng | G10L 15/063 |
| 2022/0286263 | A1* | 9/2022 | Qin | G06N 7/01 |
| 2022/0318255 | A1* | 10/2022 | Fei | G06F 16/24578 |

OTHER PUBLICATIONS

Chen et al., "UNITER: universal image-text representation learning," arXiv preprint arXiv:1909.11740, 2020. (26pgs).
Conneau et al., "Cross-lingual language model pretraining," In Advances in Neural Information Processing Systems (NeurIPS), 2019. (11pgs).
Faghri et al.,"VSE++: improving visualsemantic embeddings with hard negatives," arXiv preprint arXiv:1707.05612, 2018. (14pgs).
Gan et al., "Large-scale adversarial training for vision-and-language representation learning," In Advances in Neural Information Processing Systems (NeurIPS), 2020. (13pgs).
Huang et al., "Unicoder: A universal language encoder by pretraining with multiple cross-lingual tasks," arXiv preprint arXiv:1909.00964, 2019. (10pgs).
Karpathy et al., "Deep visualsemantic alignments for generating image descriptions," In Proc. of the IEEE Conference on Computer Vision & Pattern Recognition (CVPR), 2015.(10p).
Kingma et al., "Adam: A method for stochastic optimization," In Proceedings of the 3rd International Conference on Learning Representations (ICLR), 2015. (15pgs).
Krishna et al.,"Visual genome: Connecting language and vision using crowdsourced dense image annotations," Int. J. Comput. Vis., 123(1):32-73., 2017. (42pgs).
Lee et al, "Stacked cross attention for image-text matching," In Proceedings of the 15th European Conference on Computer Vision (ECCV), 2018. (16pgs).
Li et al., "Unicoder-VL: A universal encoder for vision and language by cross-modal pretraining," In Proc. of the 34th AAAI Conf. on Artificial Intelligence (AAAI), 2020.(9pgs).
Lin et al., "Microsoft COCO: common objects in context," arXiv preprint arXiv:1405.0312, 2015. (15pgs).
Luo et al., "UniVL: A unified video and language pre-training model for multimodal understanding and generation," arXiv preprint arXiv:2002.06353, 2020. (15 pgs).
Miyazaki et al., "Crosslingual image caption generation," In Proceedings of the 54th Annual Meeting of the Association for Computational Linguistics (ACL), 2016. (11pgs).
Mohammadshahi et al., "Aligning multilingual word embeddings for cross-modal retrieval task," arXiv preprint arXiv:1910.03291, 2019. (7pgs).
Ordonez et al.,"Im2text: Describing images using 1 million captioned photographs," In Advances in Neural Information Processing Systems (NIPS), 2011. (9pgs).
Pryzant et al., "JESC: Japanese-English subtitle corpus," In Proceedings of the Eleventh International Conference on Language Resources & Evaluation (LREC), 2018. (5pgs).
Su et al., "VL-BERT: pretraining of generic visual-linguistic representations," arXiv preprint arXiv:1908.08530, 2020. (16pgs).
Vaswani et al., "Attention is all you need," In Advances in Neural Information Processing Systems (NIPS), 2017. (11pgs).
Wehrmann et al., "Language-agnostic visual-semantic embeddings," In Proceedings of the IEEE International Conference on Computer Vision (ICCV), 2019. (10pgs).
P. Yu et al., "Cross-lingual language model pretraining for retrieval," In Proceedings of the Web Conference (WWW), 2021. (11pgs).
T. Yu et al., "Combo-attention network for baidu video advertising," In Proceedings of the 26th ACM SIGKDD Conference on Knowledge Discovery & Data Mining (KDD), 2020. (9pgs).
Lample et al., "Cross-lingual Language Model Pretraining," arXiv preprint arXiv:1901.07291, 2019. (10pgs).
Pryzant et al., "JESC: Japanese-English subtitle corpus," arXiv preprint arXiv:1710.10639, 2018. (5pgs).

* cited by examiner

| Method | Dataset 2 (en) | | | | | | Dataset 1 (en) | | | | | |
|---|---|---|---|---|---|---|---|---|---|---|---|---|
| | img2txt Recall@ | | | txt2img Recall@ | | | img2txt Recall@ | | | txt2img Recall@ | | |
| | 1 | 5 | 10 | 1 | 5 | 10 | 1 | 5 | 10 | 1 | 5 | 10 |
| SCAN | 72.7 | 94.8 | 98.4 | 58.8 | 88.4 | 94.8 | 67.4 | 90.3 | 95.8 | 48.6 | 77.7 | 85.2 |
| Unicoder-VL | 84.3 | 97.3 | 99.3 | 69.7 | 93.5 | 97.2 | 86.2 | 96.3 | 99.0 | 71.5 | 90.9 | 94.9 |
| VL-BERT | 76.4 | 96.8 | 99.2 | 64.1 | 90.9 | 96.3 | 79.8 | 94.9 | 96.8 | 61.8 | 86.4 | 92.1 |
| Tested Embod. | 80.5 | 97.1 | 99.5 | 65.1 | 91.7 | 96.5 | 80.6 | 94.9 | 97.9 | 63.3 | 87.6 | 92.4 |

TABLE 2:
Cross-modal retrieval results (in percentage %) for English. Best results are marked in bold.

FIG. 9

| Method | Dataset 2 (ja) | | | | | | | Dataset 1 (de) | | | | | | |
|---|---|---|---|---|---|---|---|---|---|---|---|---|---|---|
| | img2txt Recall@ | | | txt2img Recall@ | | | | img2txt Recall@ | | | txt2img Recall@ | | |
| | 1 | 5 | 10 | 1 | 5 | 10 | | 1 | 5 | 10 | 1 | 5 | 10 |
| SCAN | 56.5 | 85.7 | 93.0 | 42.5 | 73.6 | 83.4 | | 51.8 | 82.0 | 91.0 | 35.7 | 60.9 | 71.0 |
| AME | 55.5 | 87.9 | 95.2 | 44.9 | 80.7 | 89.3 | | 40.5 | 74.3 | 83.4 | 31.0 | 60.5 | 70.6 |
| LIWE | 56.9 | 86.1 | 94.1 | 45.1 | 78.0 | 88.2 | | 50.9 | 87.5 | 93.7 | 42.3 | 71.1 | 79.8 |
| Translate-test | 66.2 | 88.8 | 94.8 | 52.1 | 82.5 | 90.6 | | 60.8 | 90.2 | 94.8 | 51.2 | 77.9 | 86.6 |
| VL-BERT | 60.3 | 85.9 | 94.5 | 48.4 | 81.7 | 90.5 | | 65.7 | 88.0 | 94.0 | 47.4 | 77.0 | 85.4 |
| Tested Embod. | 67.4 | 90.6 | 96.2 | 54.4 | 84.4 | 92.2 | | 71.1 | 91.2 | 95.7 | 53.7 | 80.5 | 87.6 |

TABLE 3:
Cross-modal retrieval results for Japanese (Dataset 2) and German (Dataset 1).
Best results with statistical significance are marked in bold (one-sample t-test with $p < 0.05$).

FIG. 10

SYSTEMS AND METHODS FOR CROSS-LINGUAL CROSS-MODAL TRAINING FOR MULTIMODAL RETRIEVAL

CROSS-REFERENCE TO RELATED APPLICATION(S)

This patent application is related to and claims priority benefit under 35 USC § 119(e) to commonly-owned U.S. Pat. App. No. 63/190,667, filed on 19 May 2021, entitled "SYSTEMS AND METHODS FOR CROSS-LINGUAL CROSS-MODAL TRAINING FOR MULTIMODAL RETRIEVAL," and listing Hongliang Fei, Tan Yu, and Ping Li as inventors, which patent document is incorporated by reference herein in its entirety and for all purposes.

BACKGROUND

A. Technical Field

The present disclosure relates generally to systems and methods for computer learning that can provide improved computer performance, features, and uses. More particularly, the present disclosure relates to systems and methods for cross-lingual cross-modal training for multimodal retrieval and for deployment of trained multimodal retrieval models.

B. Background

Recent pretrained vision-language models based on Transformers have achieved remarkable performance on cross-modal retrieval, image captioning, and visual question and answering (VQA) tasks in English. For instance, most leading competitors in a recent VQA contest relied on transformer-based pretrained vision-language models. However, their success heavily depended on the availability of a large amount of annotated image-caption pretraining datasets (e.g., conceptual captions). In reality, there are limited such data in other languages.

When generalizing to cross-lingual cross-modal applications, a straightforward way is to utilize machine translation (MT) tools to translate non-English text to English and reuse pretrained models in English. Nevertheless, the performance strongly relies on the MT tool's capability and suffers from high latency problems in real-world applications.

To learn multilingual multimodal representations, recent researchers utilized multilingual datasets to model images and text captions in a joint embedding space. Based on how the shared feature space is learned, there are two categories: word-level alignments and sentence-level alignments. Those models can capture a certain level of semantic similarity among languages and images. They, however, only modeled the relevance with global features of text and images. Such a limitation may prevent these models from effectively detecting relevance locally. In parallel, cross-lingual language models such as multilingual BERT and XLM, and pretrained vision-language models have been prevalent in bridging different languages and modalities. Those models use the Transformer architecture simultaneously trained from multiple languages or image-caption pairs to construct an encoder and fine-tune the encoder for downstream task-specific objectives. The whole process enables sufficient interaction across languages and modalities. However, current cross-lingual models and cross-modal models are trained separately on multilingual corpus and English-caption data. Hence the resulting pretrained models are not directly applicable to downstream cross-modal tasks involving non-English languages.

Accordingly, what is needed are systems and methods that provide cross-lingual cross-modal pretraining framework embodiments to learn a language invariant representation across image and text modalities.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

Figure ("FIG.") 1 illustrates cross-lingual and cross-modal relationship between data, according to embodiments of the present disclosure.

FIG. 9 contains TABLE 2, which depicts cross-modal retrieval results (in percentage %) for English, according to embodiments of the present disclosure.

FIG. 10 contains TABLE 3, which depicts cross-modal retrieval results for Japanese (Dataset 2) and German (Dataset 1), according to embodiments of the present disclosure.

DETAILED DESCRIPTION OF EMBODIMENTS

Figure 1:
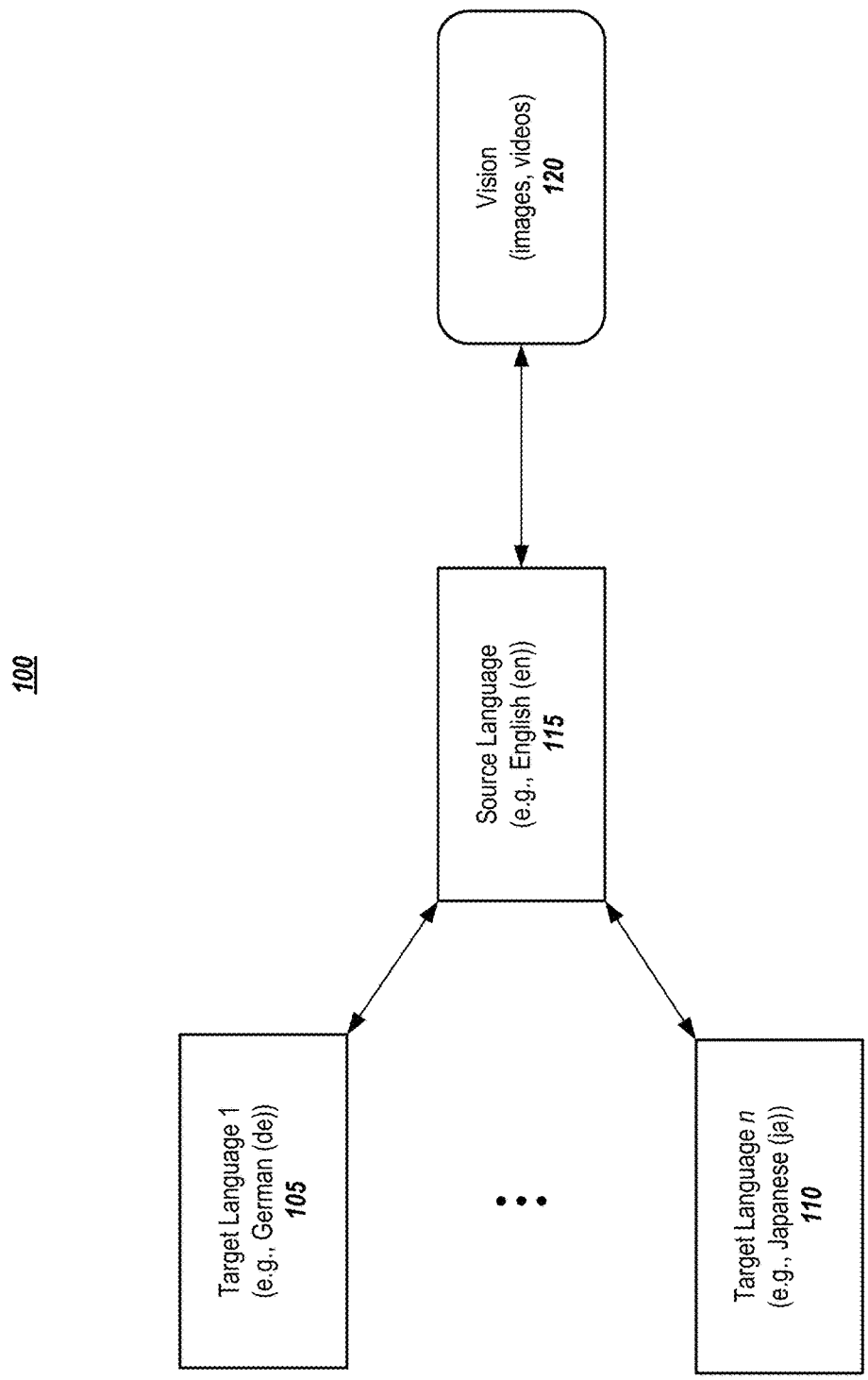

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," and "comprising" shall be understood to be open terms and any lists the follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); (5) an acceptable outcome has been reached; and (6) all of the data has been processed.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. General Introduction

Pretrained vision-language models have achieved remarkable performance in multimodal applications involving English language. However, these successes heavily depended upon the availability of large-scale image-text data for pretraining. A critical issue is the lack of large-scale datasets in other languages. To address the lack of large-scale datasets in other languages embodiments seek to transfer knowledge between non-English languages and vision modality via English as a bridge, as graphically illustrated in FIG. 1. As shown in FIG. 1, a large dataset or large datasets of source language text 115 and vision data (e.g., images and videos) 120 form source language-image data. Thus, the source language data 115 can act as a bridge between the image data 120 and one or more target languages (e.g., target language 105, 110).

Presented herein are systems and methods for cross-lingual cross-modal pretraining framework embodiments to learn a language invariant representation across image and text modalities. Introducing pretraining objectives related to other languages and modeling the interaction between English and other languages leads to better representations and generalizes well to downstream tasks. Embodiments introduce monolingual and parallel corpus related with other languages to refine the shared latent space further, extending vision-language pretraining works that adjust parameters based on the English image caption data.

Figure 2:
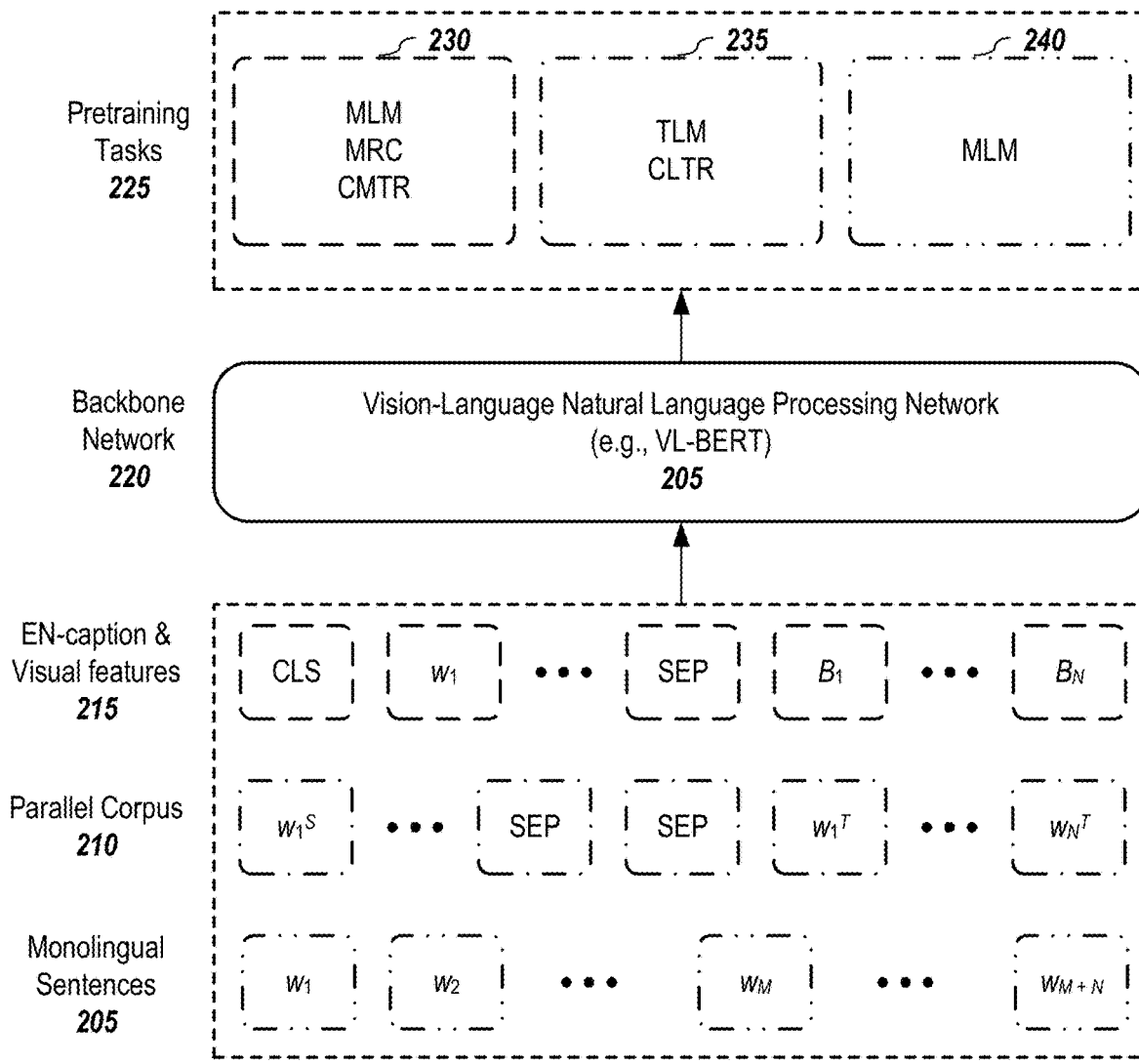
FIG. 2 graphically depicts a pertaining model, according to embodiments of the present disclosure.

FIG. 2 graphically depicts a skeleton view of a pretraining framework embodiment, according to embodiments of the present disclosure. In one or more embodiments, the framework embodiment depicted in FIG. 2 is built on top of vision-language natural language processing (e.g., VL-BERT) models 220 with more pretraining objectives and more data sources covering different languages and modalities. In one or more embodiments, this backbone network is a single stream multimodal BERT variant with cross-attention among text and image bounding box features.

In the depicted embodiment, the input data comprises three sources: source language captions (e.g., English captions) and corresponding visual bounding box features 215, parallel sentences involving the source language (e.g., English) and other languages 210 to build connections between other languages and the source language and the source language to vision domain, and monolingual text corpus 205. There is correspondence between data sources and pretraining tasks encoded in different line patterns. Thus, the MLM (masked language modeling), MRC (masked region classification), and CMTR (cross-modal text recovery) tasks 230 are related to the source language caption input 215, which comprises a classification token (CLS), source language caption (i.e., $w_1, w_2, \ldots$), a separator token (SEP), and the corresponding image features (i.e., $B_1, \ldots, B_N$). The TLM (translation language modeling) and CLTR (cross-lingual text recovery) tasks 235 are related to the parallel corpus 210, which comprises the source language caption separated by a separator token or tokens, and corresponding (or parallel) caption in a target language. Finally, the MLM task 240 is related to the monolingual text 205, which could be text in any language.

The acronyms for pretraining tasks are summarized in TABLE 1, below:

TABLE 1

Frequently used acronyms

| | |
|---|---|
| MLM | Masked language modeling task |
| TLM | Translation language modeling task |
| MRC | Masked region classification task |
| CLTR | Cross-lingual text recovery task |
| CMTR | Cross-modal text recovery task |

For the language part, in one or more embodiments, masked language modeling (MLM) (Jacob Devlin, Ming-Wei Chang, Kenton Lee, and Kristina Toutanova. 2019. BERT: Pre-Training Of Deep Bidirectional Transformers For Language Understanding. In *Proceedings of the 2019 Conference of the North American Chapter of the Association for Computational Linguistics: Human Language Technologies* (*NAACL-HLT*), pages 4171-4186, Minneapolis, MN (hereinafter, "Devlin et al., 2019")) is used on monolingual text corpus, and translation language modeling (TLM) adopted from XLM (Alexis Conneau and Guillaume Lample. 2019. Cross-lingual Language Model Pretraining. In *Advances in Neural Information Processing Systems* (*NeurIPS*). Vancouver, Canada, 7057-7069 (hereinafter, "Conneau and Lample, 2019")), which is incorporated by reference herein in its entirety) on parallel text corpus. In one or more embodiments, standard vision-language pretraining models are followed for the vision-language part and MLM is used on text caption and masked region classification (MRC). A cross-lingual text recovery (CLTR) task has been used, for example in Unicoder (Haoyang Huang, Yaobo Liang, Nan Duan, Ming Gong, Linjun Shou, Daxin Jiang, and Ming Zhou. 2019. Unicoder: A Universal Language Encoder by Pretraining With Multiple Cross-Lingual Tasks. In *Proceedings of the 2019 Conference on Empirical Methods in Natural Language Processing and the 9th International Joint Conference on Natural Language Processing* (*EMNLP-IJCNLP*), pages 2485-2494, Hong Kong, China (hereinafter, "Huang et al., 2019"), which is incorporated by reference herein in its entirety). A related but different task, cross-modal text recovery (CMTR), was developed, and CMTR embodiments are presented herein. Like CLTR, CMTR leverages an attention matrix between image-caption pairs to learn the alignment relation among words and regions of interest in images.

In one or more embodiments, text-to-image and image-to-text retrieval tasks are performed on two multimodal multilingual image caption benchmarks: Dataset 1 (German and English) captions and Dataset 2 (English and Japanese). State-of-the-art (SOTA) results are achieved on retrieval tasks involving Japanese and German languages, compared with a machine translation baseline and other recently published works.

B. Some Related Work

1. Vision-Language Pretrained Model

Recently, BERT-based vision-language pretraining models have emerged. In those models, the pretraining typically consists of three types of tasks: 1) masked language modeling, 2) masked region modeling, and 3) text-image matching. By exploiting the cross-modal attention and being pretrained on large-scale datasets, cross-modal BERT methods have achieved state-of-the-art performance in many text-vision understanding tasks. Nevertheless, all the above models deal with a single language English and image or video domain.

2. Cross-Lingual Pretrained Model

Cross-lingual pretrained language models are capable of simultaneously encoding texts from multiple languages. Most notably, multilingual BERT (Devlin et al., 2019), which is incorporated by reference herein in its entirety) takes the same model structure and training objective as BERT but was pretrained on more than 100 languages on Wikipedia. XLM model was pretrained with MLM and TLM to take advantage of parallel sentence resources if available. Evaluations on a series of cross-lingual transfer tasks have shown that these cross-lingual LMs have significant utilities for transferring knowledge between languages. For example, co-pending and commonly-owned U.S. patent application Ser. No. 17/027,560, filed on 19 Mar. 2021, entitled "CROSS-LINGUAL UNSUPERVISED SENTIMENT CLASSIFICATION WITH MULTI-VIEW TRANSFER LEARNING," and listing Hongliang Fei and Ping Li as inventors, which claims the priority benefit under 35 USC § 119(e) to co-pending and commonly-owned U.S. Pat. App. No. 63/039,967, filed on 16 Jun. 2020, entitled "CROSS-LINGUAL UNSUPERVISED SENTIMENT CLASSIFICATION WITH MULTI-VIEW TRANSFER LEARNING," listing Hongliang Fei and Ping Li as inventors (each patent document is incorporated by reference herein in its entirety and for all purposes) performed evaluations on a series of cross-lingual transfer tasks.

Embodiments herein present integrations of cross-lingual pretraining tasks with vision-language pretraining to obtain a universal multilingual multimodal representation.

C. Methodology Embodiments

Framework embodiments follow the network structure of VL-BERT, which is presented in Weijie Su, Xizhou Zhu, Yue Cao, Bin Li, Lewei Lu, Furu Wei, and Jifeng Dai, "VL-BERT: Pretraining of Generic Visual-Linguistic Representations," in *Proceedings of the 8th International Conference on Learning Representations* (*ICLR*), Addis Ababa, Ethiopia (2020) (hereinafter, "Su et al., 2020"), which is incorporated by reference herein in its entirety. VL-BERT is a single-stream cross-modal model that concatenates word features from the text and bounding box features from the image and feeds the concatenated sequence into a series of transformer blocks. Although embodiments described herein may use or adapt VL-BERT as part of the framework, it shall be noted that other models and network structures may be used.

1. Pretraining Tasks Embodiments

Both vision-grounded masked language model (MLM) and text-grounded masked region classification (MRC) tasks on image-caption data are used in model embodiments. In one or more embodiments, since auxiliary multilingual text corpus is introduced, masked language modeling grounded by the text in other languages is also used.

Pretrained models may be further improved by involving more tasks; thus, in one or more embodiments, two additional cross-lingual pretraining tasks and one cross-modal task are introduced and employed to enhance performance.

a) Masked Language Modeling (MLM) Embodiments

Masked Language Modeling (MLM) is a language modeling in which part of the input is masked and the model learns to predict the missing tokens. An example training object is discussed in Yen-Chun Chen, Linjie Li, Licheng Yu, Ahmed El Kholy, Faisal Ahmed, Zhe Gan, Yu Cheng, and Jingjing Liu, UNITER: UNiversal Image-TExt Representation Learning, available at arXiv:1909.11740v3 (2020) (hereinafter, "Chen et al., 2020"), which is incorporated by reference herein in its entirety. In one or more embodiments, image regions may be denoted as $r=\{r_1, \ldots, r_K\}$ the input words may be denoted as $w=\{w_1, \ldots, w_T\}$, and the mask indices as $m \in \mathbb{N}^M$, where $\mathbb{N}$ is the natural numbers, M is the number of masked tokens, and m is the set of masked indices. In MLM, the input words are masked out given a probability (e.g., 15%). The masked words $w_m$ are replaced with a special token (e.g., [MASK]). The goal is to predict these masked words based on the observation of their surrounding words $w_{\backslash m}$ and all image regions v, by minimizing the following negative log-likelihood equation:

$$\mathcal{L}_{MLM}(\theta) = -\mathbb{E}_{(w,v) \sim D} \log P_\theta(w_m|w_{\backslash m}, v)$$

wherein θ represents the trainable parameters. Each pair (w, v) may be sampled from a training set, D.

b) Masked Region Classification (MRC) Embodiments

Similar to MLM, image regions may be sampled, and their visual features masked with a probability (e.g., 15%). The model may be trained to reconstruct the masked regions $v_m$ given the remaining regions $v_{\backslash m}$ and all the words w. The visual features of the masked region may be replaced by zeros. Because visual features are high-dimensional and continuous, they cannot be supervised via class likelihood. A base objective may be defined as:

$$\mathcal{L}_{MRC}(\theta) = \mathbb{E}_{(w,v) \sim D} f_\theta(v_m|v_{\backslash m}, w)$$

As discussed in Chen et al., 2020, MRC learns to predict the object semantic class for each masked region. The Transformer outputs of the masked region $v_m^{(i)}$ may be first fed into a fully connected layer to predict the scores of K object classes, which further goes through a softmax function to be transformed into a normalized distribution $g_\theta(v_m^{(i)}) \in \mathbb{R}^K$. Note that there may not be a ground-truth label. Thus, the object detection output from an object detection model, such as Faster R-CNN (Peter Anderson, Xiaodong He, Chris Buehler, Damien Teney, Mark Johnson, Stephen Gould, and Lei Zhang. 2018. Bottom-Up and Top-Down Attention for Image Captioning and Visual Question Answering. In *Proceedings of the* 2018 *IEEE Conference on Computer Vision and Pattern Recognition (CVPR)*, pages 6077-6086, Salt Lake City, UT (hereinafter, "Anderson et al., 2018"), which is incorporated by reference herein in its entirety), may be used, and the detected object category with the highest confidence score may be taken as the label of the masked region, which is converted into a one-hot vector $c(v_m^{(i)}) \in \mathbb{R}^K$. A final objective may be defined as minimizing the cross-entropy (CE) loss as follows:

$$f_\theta(v_m|v_{\backslash m}, w) = \Sigma_{i=1}^M CE(c(v_m^{(i)}), g_\theta(v_m^{(i)}))$$

c) Cross-Model Text Recovery (CMTR) Embodiments

Figure 3:
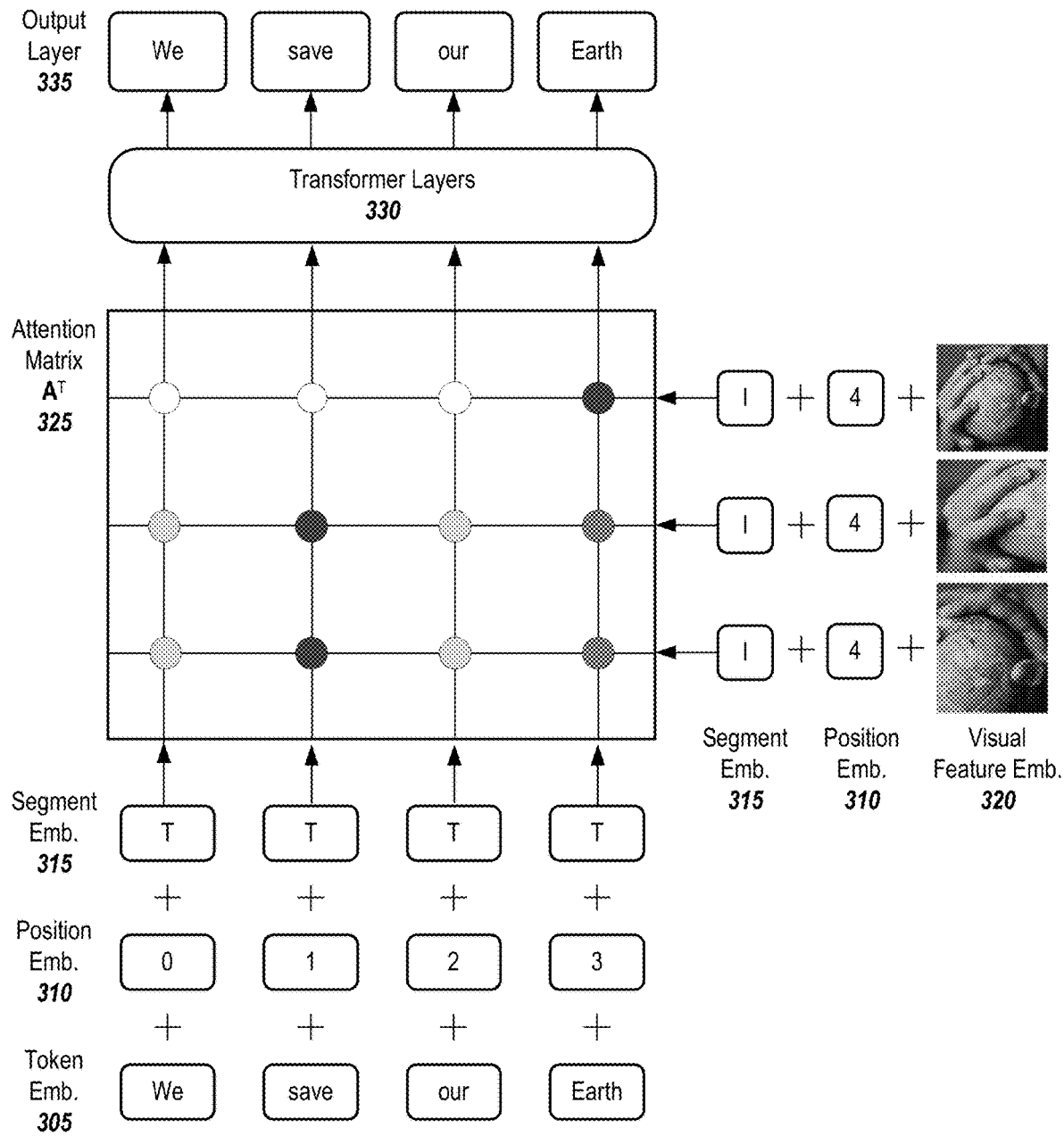
FIG. 3 graphically depicts a cross-modal text recovery system and method flow, according to embodiments of the present disclosure.

FIG. 3 graphically depicts a cross-modal text recovery system and method flow 300, according to embodiments of the present disclosure. As illustrated, the system comprises a set of embedding layers or inputs—token embedding 305, position embedding 310, segment embedding 315, and visual feature embedding 320. The token embeddings represent the embeddings of the input words. The visual feature embeddings are vector representations for different bounding boxes extracted from an input image using object detection models, such as Faster R-CNN (Anderson et al. 2018). The positional embeddings represent the position of the input and may run sequentially; note that in this embodiment, the visual feature embeddings from the different bounding boxes from the input image all have the same positional embedding value. Finally, the segment embeddings represent that type of input. In the depicted embodiments of FIG. 3, "T" represents that the input is text, and "I" represents that the input is derived from an image. The system 300 also comprises an attention matrix 325 that gauges similarity or relatedness between input text tokens and input visual features. The output of the attention matrix is used to calculate an attended representation for input caption tokens with bounding box features. In one or more embodiments, the attended representation is then fed into the transformer layers 330, which may be a VL-BERT implementation (e.g., the backbone network 220), and evaluate the recovery loss. A description of method embodiments are described below.

In one or more embodiments, the CMTR system 300 directly learns the underlying alignments between words and regions of interest in images and generates an attended input to stacked transformer layers to recover all input words. Note that the attention matrix 325 is transposed.

As shown in FIG. 3, the CMTR embodiment is based on the image-caption pairs as input, but it does not use the original caption words. Instead, it computes an alignment between word features and bounding box features extracted by tools (e.g., Faster-RCNN), and uses attended features to simultaneously recover all input words. In particular, let (B,E) be an image-caption input pair, where $B=(b_1, b_2, \ldots, b_n)$ are bounding box feature embeddings and $E=(e_1, e_2, \ldots, e_m)$ are word embeddings. In one or more embodiments, the CMTR embodiment first calculates an attended representation for the caption words with bounding box features as $\hat{e}_i = \Sigma_{j=1}^n \tilde{a}_{ij} b_j$, where $\tilde{a}_{ij} = \text{softmax}(A_{i,:})[j]$, $b_j \in \mathcal{R}^h$, $e_i \in \mathcal{R}^h$, and h denotes the embedding dimension. $A \in \mathcal{R}^{m \times n}$ is the attention matrix calculated by bi-linear attention as $A_{ij} = e_i^T W b_j$, where W represents trainable parameters. Finally, in one or more embodiments, $\hat{E} = \tan h((\hat{e}_1, \hat{e}_2, \ldots, \hat{e}_m))$ is taken as input and the original caption words are predicted. In one or more embodiments, the objective function is:

$$l(X; e, d) = \mathbb{E}_{x \sim X}[\Delta(x, d(e(x)))] \quad (1)$$

where $\Delta(.,.)$ is the sum of token-level cross-entropy loss and e(.) is the encoder component including the input layer, the attention layer, and transformer layers. d(.) is the decoder applied on the output of transformers, which may be a shared linear projection layer with other MLM tasks and CLTR task introduced below.

d) Cross-lingual Text Recovery (CLTR) Embodiments

This task (CLTR) may be considered adapted from Unicoder (Huang et al., 2019), which takes a pair of parallel sentences (X, Y) and lets the pretrained model learn the underlying word alignments between two languages. In one or more embodiments, the model structure for the CLTR task is the same as for CMTR as illustrated in FIG. 3. Thus, similar to the CMTR embodiment, a bi-linear attention mechanism (e.g., an attention matrix 325) is also used to compute an attended representation $\hat{X}$ for one sentence X in the source language with the other sentence Y, and then try to recover input X using the attended input $\hat{X}$. In a CLTR task, the same objective function in Eq. (1) may be optimized. Note that, in one or more embodiments, CLTR and CMTR do not share attention parameters since there is still a large modal gap between text and image before applying cross-attention.

Thus, given a bilingual sentence pair (X, Y), where $X=(x_1, x_2, \ldots, x_m)$ is a sentence with m words from a source language s, $Y=(y_1, y_2, \ldots, y_n)$ is a sentence with n words from a target language t, this task first represents each $x_i$ as $x_i^t \in R^h$ by all word embeddings of Y:

$$x_i^t = \Sigma_{j=1}^n \text{softmax}(\Omega_{ij}) y_j^t$$

where $x_i^s \in R^h$ and $y_j^t \in R^h$ denote the word embeddings of $x_i$ and $y_j$, respectively, h denotes the word embedding dimension, and $\Omega \in R^{m \times n}$ is an attention matrix calculated by:

$$\Omega_{ij} = x_i^{sT} V y_j^t$$

wherein $V \in R^{m \times n}$ is a trainable weight. Then, the system takes $X^t = (x_1^t, x_2^t, \ldots, x_n^t)$ as input and tries to predict the original word sequence X.

e) Translation Language Model Embodiments

This task (TLM) may be considered adapted from XLM (Conneau and Lample, 2019), which takes a pair of parallel sentences with randomly masked tokens in different languages as input. The model is trained to predict the masked tokens by attending to local contexts and distant contexts in another language.

It shall be noted that TLM essentially shares the same objective function as MLM but with parallel sentences as input. Thus, instead of considering monolingual text streams, parallel sentences are concatenated as illustrated in FIG. 2 item 210. Words may be randomly masked in both the source and target sentences. To predict a word masked in a first sentence in a first or source language, the model may either attend to surrounding words in the first or source language or to the translation in a second or target language. Thus, the model is encouraged to align the source language and the target language representations. To facilitate the alignment, the positions of target sentences may also be reset.

f) Pretraining Method Embodiments

Figure 4:
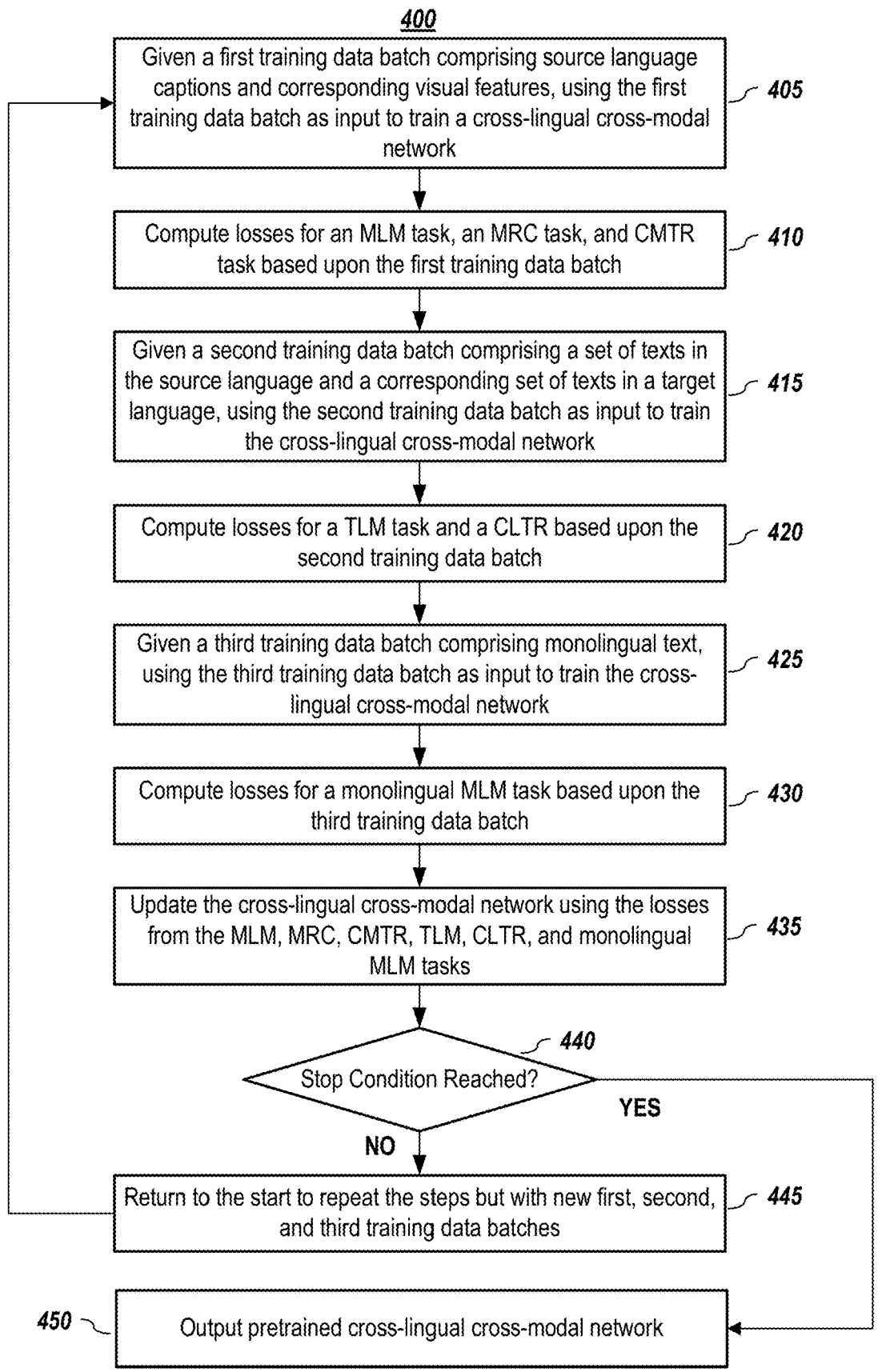
FIG. 4 depicts a method for pretraining a cross-lingual cross-modal model, according to embodiments of the present disclosure.

FIG. 4 depicts an example overview pretraining methodology, according to embodiments of the present disclosure. In one or more embodiments, given a first training data batch comprising source language captions and corresponding visual features, the first training data batch is used as input (405) to train a cross-lingual cross-modal network. Losses for an MLM task, an MRC task, and a CMTR task are computed (410) based upon the first training data batch. Note that for CMTR task, as illustrated in FIG. 3, the embeddings for the first training data batch are not input directly into the transformer layers, as with the MLM and MRC tasks, but into the attention matrix that provides cross-attention between the text input and image bounding box visual features.

Given a second training data batch comprising a set of text in a source language and a corresponding set of text in a target language, the second training data batch is used (415) as input to train a cross-lingual cross-modal network. Losses for a TLM task and a CLTR are computed (420) based upon the second training data batch. Note that like the CMTR task, for CLTR task, the embeddings for the second training data batch are not input directly into the transformer layers but into an attention matrix.

Given a third training data batch comprising monolingual text, the third training data batch of monolingual text is used (425) as input to train the cross-lingual cross-modal network, and losses for an MLM task are computed (430) based upon the third training data batch.

With the losses from the various tasks, the cross-lingual cross-modal network is updated via backpropagation using the aggregated losses from the MLM, MRC, CMTR, TLM, CLTR, and monolingual MLM tasks. The aggregated losses may be combined uniformly or may be combined in a weighted manner, in which the weightings may be trained parameters or may be hyperparameters. In one or more embodiments, a computation graph may be used to track losses and related parameters for updating related to a particular loss component; that is, the attention matrices for the CMTR task and the CLTR task may be updated appropriately.

If a stop condition has not been reached, the next first, second, and third training data batches (which collectively may be referred to as a superbatch) are selected (445) and the process repeats by returning to step 405.

If a stop condition has been reached, the pretrained cross-lingual cross-model model is output. In one or more embodiments, the pretrained cross-lingual cross-model model may then be fine-tuned, which is discussed in the next section.

It shall be noted that for pretraining, the MLM, TLM, CLTR, and CMTR tasks may share one linear projection layer (which may have a size of hidden_dimension*vocabulary size) 335 at each output token. And, the MRC task may have its own linear projection layer (which may have a size of hidden_dimension*object_type_size).

It shall also be noted that, in one or more embodiments, for the source language in the first and second training datasets is the bridge language that is being used to help support the cross lingual development—e.g., the source language is English. The language for the monolingual sentences for the third data batch may be any language.

2. Fine-Tuning for Cross-Modal Retrieval Embodiments

To help improve performance, particularly for a non-source language, fine-tuning of the pretrained network may be performed. One of the benefits for fine-tuning is that the one or more non-source languages used in fine-tuning do not require as large of a dataset as typically would be needed to obtain a same or similar performance level.

Figure 5:
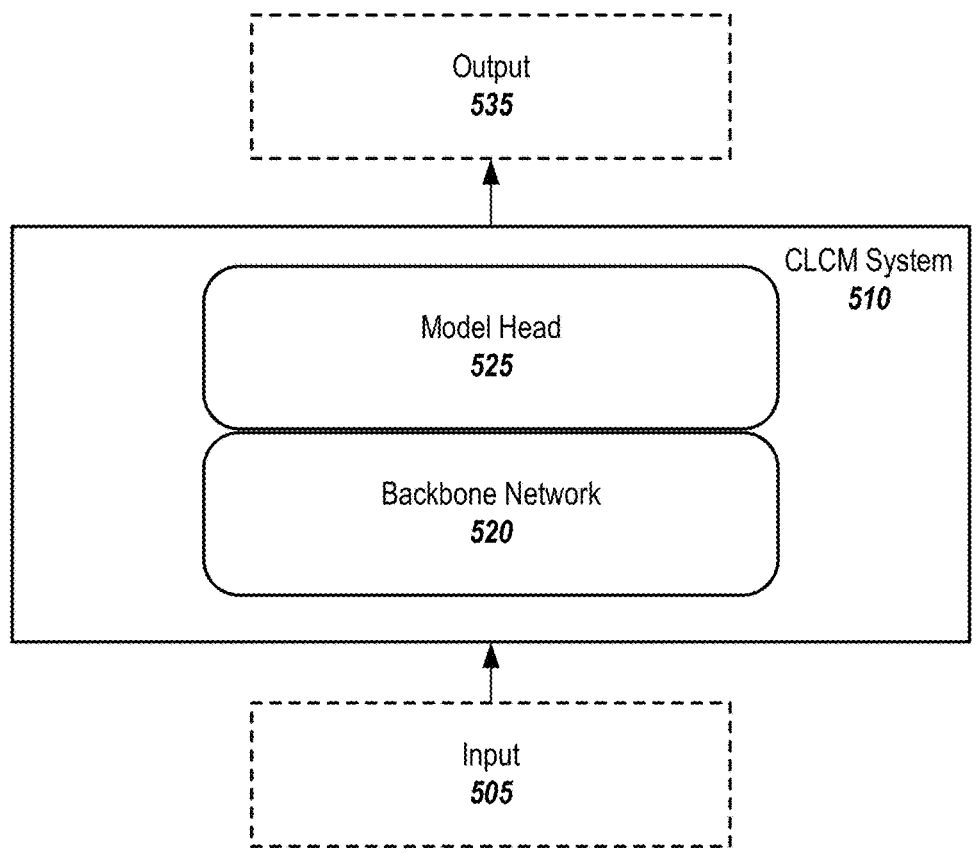
FIG. 5 graphically depicts an architecture for fine-tuning a pretrained cross-lingual cross-model (CLCM) network, according to embodiments of the present disclosure.

FIG. 5 graphically depicts an architecture for fine-tuning a pretrained cross-lingual cross-model (CLCM) network, according to embodiments of the present disclosure. In one or more embodiments, the CLCM network or system 510 comprises the pretrained backbone network 520 (e.g., backbone network 220 of FIG. 2/transformer layers 330 of FIG. 3) that feeds into a model head 525, which may be a feedforward network or another type of network, which generates the output 535.

For fine-tuning, in one or more embodiments, the triplet ranking loss may be minimized to fine-tune a retrieval model embodiment (e.g., CLCM system 510). To boost the performance, hard negative mining may be used.

Figure 6:
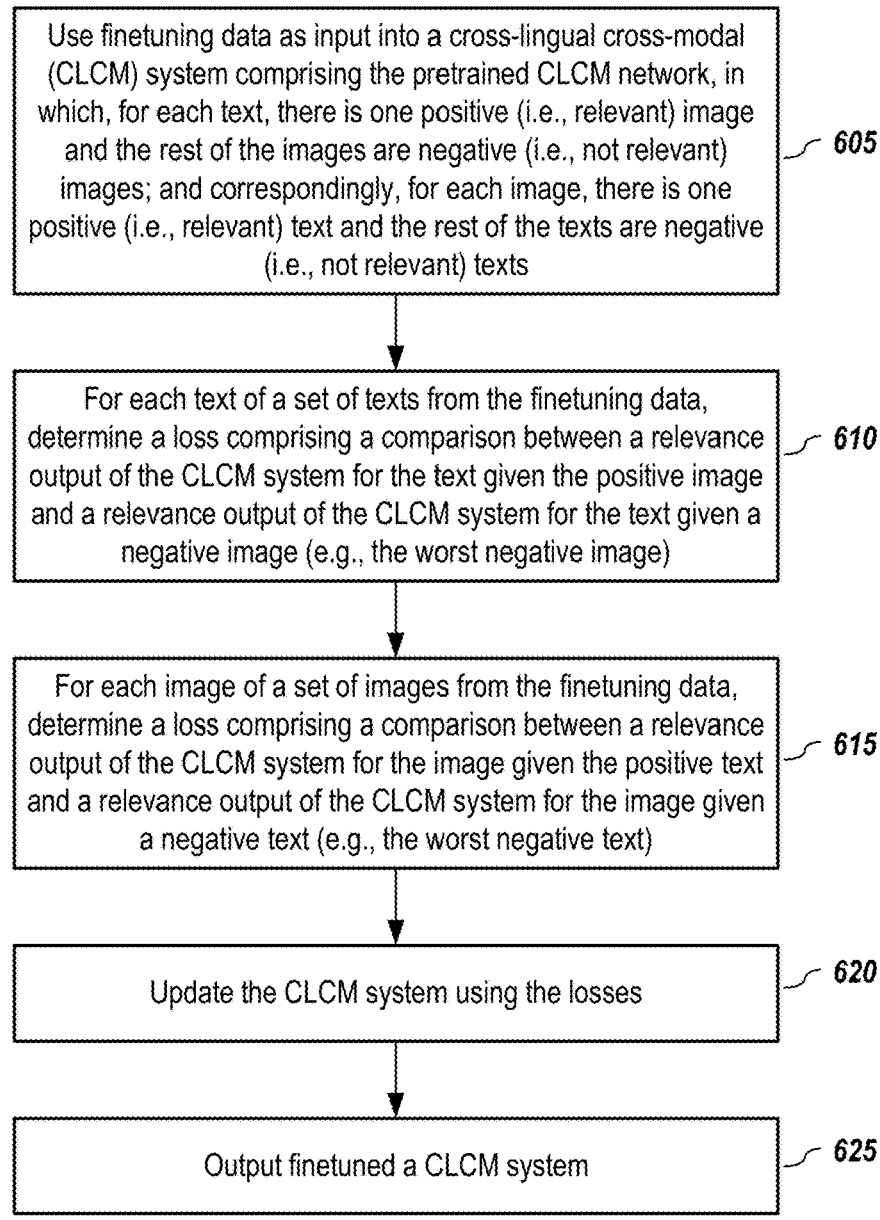
FIG. 6 depicts a method for fine-tuning, according to embodiments of the present disclosure.

FIG. 6 depicts a method for fine-tuning, according to embodiments of the present disclosure. For each text query, in one or more embodiments, there is one positive (i.e., relevant) image sample, and the rest are negative (not relevant) (605). Correspondingly, for each image, there is one positive (i.e., relevant) text, and the rest are negative (not relevant) (605). For each text, a loss may be determined or obtained (610) based upon a comparison between a relevance output of the CLCM system for a text given the positive image and a relevance output of the CLCM system for the text given a negative image (e.g., the worst negative image). For example, denoting a mini-batch of training samples by $\{(q_i, I_i)\}_{i=1}^K$, where a query $q_i$ is relevant with the image $I_i$, in one or more embodiments, only the hardest negative image in the mini-batch is penalized by:

$$\mathcal{L}(q_i) = \max_{j \neq i}[R(q_i, I_j) - R(q_i, I_i) + m]_+$$

where m is the margin set to 0.2 by default (although other values may be used), and $[x]_+ = \max(0, x)$ is a clip function. $R(q,I)$ is the function to evaluate the similarity between query q and image I parameterized by u and b:

$$R(q,I) = u^T \text{BERT}_{CLS}(q,I) + b.$$

where u represents a linear layer appended on top of the pooled VL-BERT representation (e.g., a backbone network) and receives the classification [CLS] token.

For each image, a loss may be determined or obtained (615) based upon a comparison between a relevance output of the CLCM system for an image given the positive text and a relevance output of the CLCM system for the image given a negative text (e.g., the worst negative text).

For each image, in one or more embodiments, only the hardest negative query in the mini-batch is penalized:

$$\mathcal{L}(I_i) = \max_{j \neq i}[R(q_j, I_i) - R(q_i, I_i) + m]_+.$$

Considering the whole mini-batch of images and texts, the final loss function may be computed by:

$$\mathcal{L} = \frac{1}{K}\sum_{i=1}^{K}[\mathcal{L}(q_i) + \mathcal{L}(I_i)].$$

The loss may be used to update (620) the CLCM system 510 to fine-tune it. Following fine-tuning the fine-tuned CLCM system is output (625).

It shall be noted that, in one or more embodiments, more than one negative sample may be used to obtain either of the above-noted losses.

3. Use/Deployment of CLCM Network Embodiments

Figure 7:
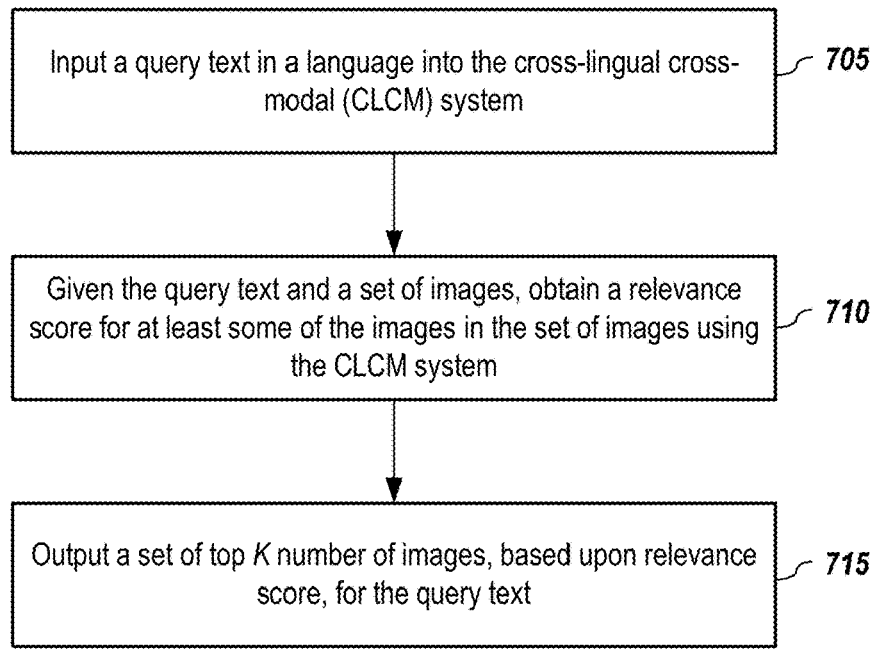
FIG. 7 depicts a method for using a cross-lingual cross-modal (CLCM) system and a query text to find a set of one or more relevant images, according to embodiments of the present disclosure.

FIG. 7 depicts a method for using a cross-lingual cross-modal (CLCM) system and a query text to find a set of one or more relevant images, according to embodiments of the present disclosure. In one or more embodiments, a query text in a language is input (705) into the CLCM system. Given the query text and a set of images, the CLCM system is used (710) to obtain a relevance score for at least some of the images in the set of images. Note that, in one or more embodiments, the language of the text query is one of the languages used in fine-tuning. Based upon the output relevance values from the CLCM system, a set of the top K images that are relevant to the query text may be output (715), where K may be one or more.

Figure 8:
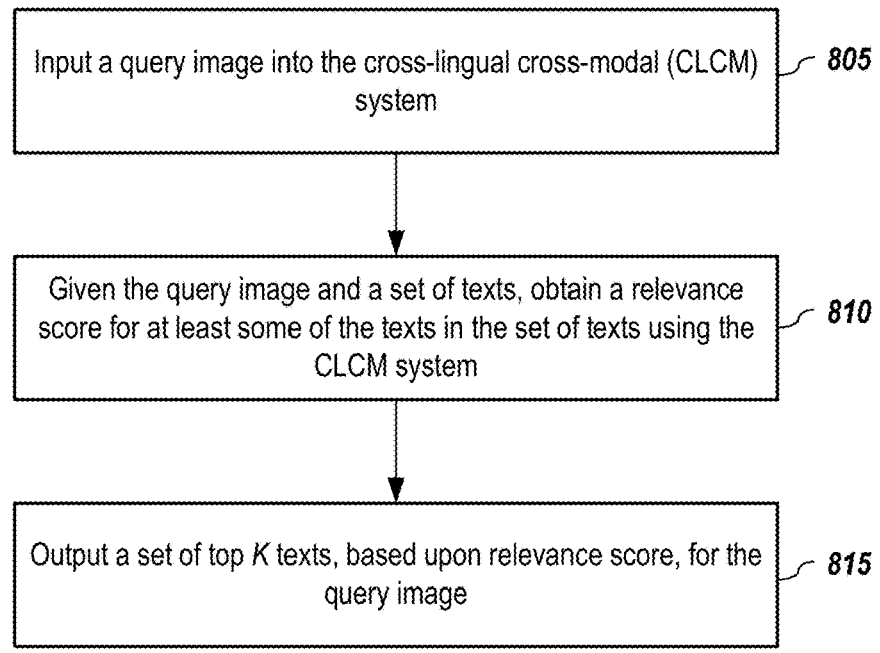
FIG. 8 depicts a method for using a CLCM system and an input image to find a set of one or more relevant texts, according to embodiments of the present disclosure.

FIG. 8 depicts a method for using a CLCM system and an input image to find a set of one or more relevant texts, according to embodiments of the present disclosure. In one or more embodiments, a query image is input (805) into the CLCM system. Given the query image and a set of texts in one or more languages, the CLCM system is used (810) to obtain a relevance score for at least some of the texts in the set of texts. Note that, in one or more embodiments, the language of the text queries is one of the languages used in fine-tuning. Based upon the output relevance values from the CLCM system, a set of the top K texts that are relevant to the query image may be output (815), where K may be one or more.

D. Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

For pretraining, two English image-caption datasets were utilized: Dataset 3 and Dataset 4. Around 3.7M text-image pairs in total were collected. For monolingual (en, de, ja) text and parallel corpus (en-de), 20M sentences were randomly sampled from Wikipedia text and 9M parallel sentences from MultiUN corpus. 2.8M en-ja parallel sentences were also collected.

For fine-tuning, two multilingual multimodal datasets for retrieval, Dataset 1 and Dataset 2. Dataset 2 contains approximately 120,000 images, and each image contains five captions. The English data was split into ~113,000 training samples, 5,000 validation samples, and 5,000 testing samples.

A subset of approximately 33,700 images had Japanese captions generated for them. Of this subset, about 23,700 samples were used for training, 5,000 for validation, and 5,000 for testing. Dataset 1 contains ~32,000 images, with each having five captions as well. The dataset was split into ~30,000 training samples, 1,000 validation samples, and 1,000 testing samples.

R@K (K=1, 5, 10) was used as evaluation metrics. R@K is the percentage of ground-truth matchings appearing in the top K-ranked results.

1. Experiment Setting

The multilingual BERT uncased version (Devlin et al., 2019) was used to initialize a tested model embodiment, which has 12 layers of Transformer blocks. Each block has 768 hidden units, 12 self-attention heads, and the vocabulary size is 105,879. The maximum sequence length was set to 64. One hundred bounding boxes per image were detected using Faster-RCNN (Anderson et al., 2018) pretrained on dataset of images annotated with region descriptions, objects, attributes, and relationships. Pretraining was conducted on 16 NVIDIA V100 GPUs (16 GB memory), and fine-tuning was conducted on 8 NVIDIA V100 GPUs. FP16 (16-bit floating point) was used to speed up training and reduce memory usage. Adam optimizer was used and the batch size was set per GPU to 16. The initial learning rate was 1e-5. The model was pretrained for 50 epochs and the retrieval model was fine-tuned based on the average of R@{1,5,10} on the validation set. The experiments were repeated five times and the average metrics on the test set were reported.

2. Baselines

Model embodiments were compared with several recent competitive methods. VL-BERT (Su et al., 2020) and Unicoder-VL (Gen Li, Nan Duan, Yuejian Fang, Ming Gong, and Daxin Jiang. 2020. Unicoder-VL: A Universal Encoder for Vision and Language by Cross-Modal Pretraining. In Proceedings of the Thirty-Fourth AAAI Conference on Artificial Intelligence (AAAI), pages 11336-11344, New York, NY (hereinafter, "Li et al., 2020"), which is incorporated by reference herein in its entirety) are two well-known cross-modal BERT based models. For VL-BERT, the English results were reproduced by fine-tuning their official pretrained model and non-English results were generated from their released code following the same configuration as the model embodiments. For Unicoder-VL, their reported English results in the paper were adopted. Besides pretraining based models, several other methods were also compared, including cross-attention based model SCAN (Lee et al., 2018), multilingual word embedding alignment-based model AME (Alireza Mohammadshahi, Remi Lebret, and Karl Aberer. 2019. Aligning Multilingual Word Embeddings for Cross-Modal Retrieval Task. In *Proceedings of the Beyond Vision and Language: inTEgrating Real-world kNowledge (LANTERN@EMNLPIJCNLP)*, pages 11-17, Hong Kong, China (hereinafter, "Mohammadshahi et al., 2019"), which is incorporated by reference herein in its entirety), and multilingual sentence alignment-based model LIME (Jonatas Wehrmann, Maurício Armani Lopes, Douglas M. Souza, and Rodrigo C. Barros. 2019. Language-Agnostic Visual-Semantic Embeddings. In *Proceedings of the IEEE International Conference on Computer Vision (ICCV)*, pages 5803-5812, Seoul, Korea (hereinafter, "Wehrmann et al., 2019"), which is incorporated by reference herein in its entirety). SCAN, AME, and LIME's reported performances from their papers were used. Finally, a comparison with a machine translation baseline was used: "Translate-test," which translates the test data in Japanese and German to English using Google Translate, and then evaluated on fine-tuned VL-BERT retrieval model in English.

3. Experimental Results

TABLE 2, which is included in FIG. 9 presents the results for English captions. Compared with Unicoder-VL (Li et al., 2020), the tested model embodiment performs slightly worse but obtains better results than VL-BERT. A possible reason is that Unicoder-VL is initialized with English BERT, which is specifically optimized for English. The benefit of the tested model embodiment is demonstrated in TABLE 3 (which is included in FIG. 10) for cross-modal retrieval tasks involving non-English languages. It is observed that the machine translation baseline "Translate-test" achieves better results than VL-BERT pretrained with MLM objective only on multilingual corpus and finetuned in the target language, proving the importance of aligning different languages.

Moreover, the average recall of the "Translatetest" is around 1-2% lower than the tested method embodiment. Such results indicate that pretraining with additional cross-lingual objectives is more effective than translating the target language into English for these two benchmarks. Though combining more powerful machine translation tools and better fine-tuned English retrieval models may lead to slightly better performance, the tested method embodiment learns a universal representation without dependency on external machine translation tools for particular language pairs, which is more suitable for real-world applications.

Finally, compared with VL-BERT (Su et al., 2020) that is only pretrained with MLM task on multilingual corpus, the tested embodiment with additional cross-lingual pretraining tasks bring performance improvement.

4. Ablation Study

To understand the effect of different components, an ablation study was conducted on the test set and the average Recall@1 is reported in TABLE 4, below. Although cross-lingual pretraining tasks (TLM and CLTR) do not help English-related retrieval tasks much, they contribute more than 1% improvement for Japanese and German. The result is under expectations since those tasks effectively link non-English languages with the vision domain using English as the bridge. Among all the components, CMTR consistently contributes around 1 point improvement.

TABLE 4

Ablation study on the average of R@1.
Best results with statistical
significance are marked in bold.

|  | Dataset 2 (en) | Dataset 2 (ja) | Dataset 1 (en) | Dataset 1 (de) |
|---|---|---|---|---|
| Full Model | 72.8 | 60.9 | 72.0 | 62.4 |
| w/o TLM | 72.6 | 58.9 | 71.9 | 60.9 |
| w/o CLTR | 72.8 | 59.3 | 71.9 | 61.1 |
| w/o CMTR | 71.2 | 60.2 | 71.1 | 61.5 |

5. Some Observations

In this patent document, embodiment of multilingual corpus and three pretraining objectives were presented to improve transformer-based vision-language models for retrieval tasks. Extensive experiments demonstrate the effectiveness of embodiments on cross-modal retrieval tasks. Detailed ablation studies justify modeling choices for embodiments. One skilled in the art shall recognize that embodiments may be extended for zero-shot transferring.

E. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drive, solid state drive, or both), one or more network ports for communicating with external devices as well as various input and output (I/O) devices, such as a keyboard, mouse, stylus, touch-screen and/or video display. The computing system may also include one or more buses operable to transmit communications between the various hardware components.

Figure 11:
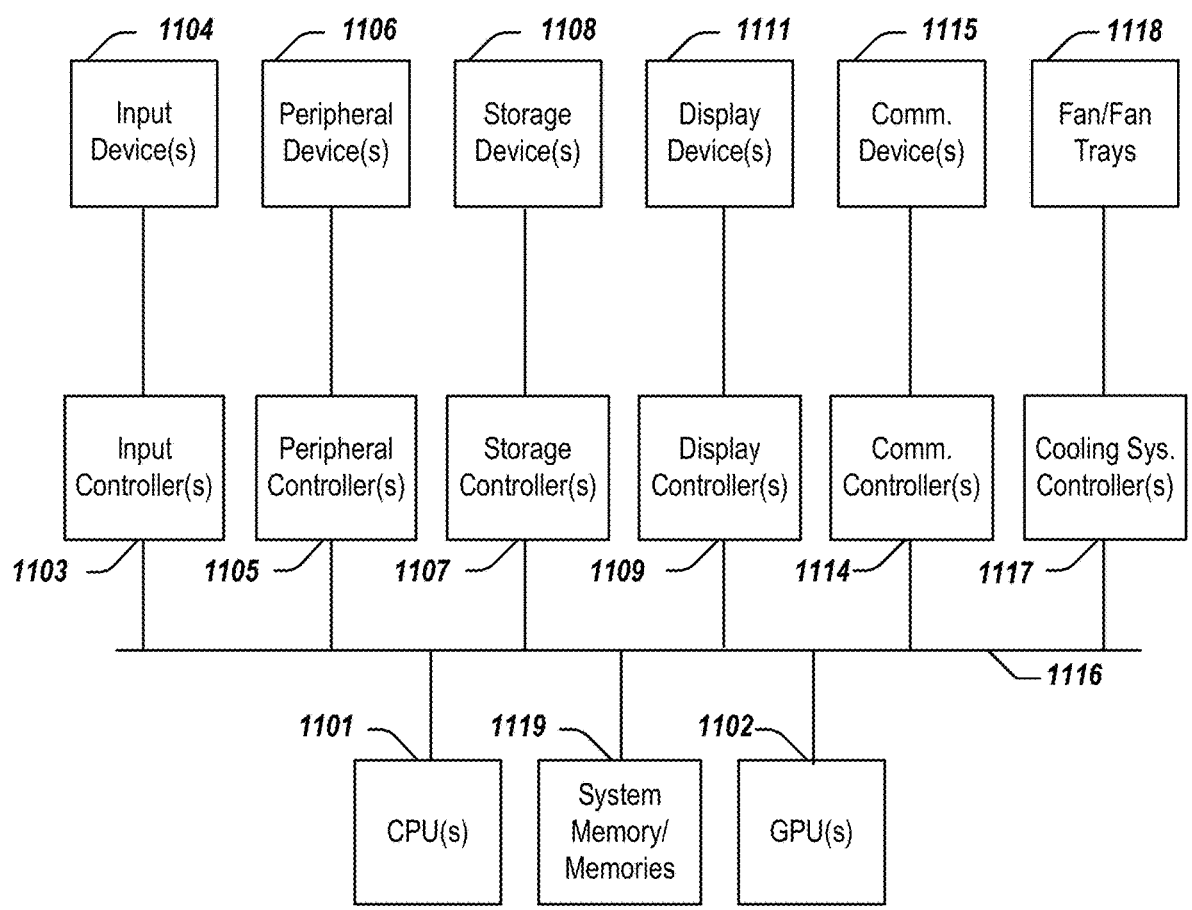
FIG. 11 depicts a simplified block diagram of a computing device/information handling system, according to embodiments of the present disclosure.

FIG. 11 depicts a simplified block diagram of an information handling system (or computing system), according to embodiments of the present disclosure. It will be understood that the functionalities shown for system 1100 may operate to support various embodiments of a computing system—although it shall be understood that a computing system may be differently configured and include different components, including having fewer or more components as depicted in FIG. 11.

As illustrated in FIG. 11, the computing system 1100 includes one or more central processing units (CPU) 1101 that provides computing resources and controls the computer. CPU 1101 may be implemented with a microprocessor or the like, and may also include one or more graphics processing units (GPU) 1102 and/or a floating-point coprocessor for mathematical computations. In one or more embodiments, one or more GPUs 1102 may be incorporated within the display controller 1109, such as part of a graphics card or cards. Thy system 1100 may also include a system memory 1119, which may comprise RAM, ROM, or both.

A number of controllers and peripheral devices may also be provided, as shown in FIG. 11. An input controller 1103 represents an interface to various input device(s) 1104, such as a keyboard, mouse, touchscreen, and/or stylus. The computing system 1100 may also include a storage controller 1107 for interfacing with one or more storage devices 1108 each of which includes a storage medium such as magnetic tape or disk, or an optical medium that might be used to record programs of instructions for operating systems, utilities, and applications, which may include embodiments of programs that implement various aspects of the present disclosure. Storage device(s) 1108 may also be used to store processed data or data to be processed in accordance with the disclosure. The system 1100 may also include a display controller 1109 for providing an interface to a display device 1111, which may be a cathode ray tube (CRT) display, a thin film transistor (TFT) display, organic light-emitting diode, electroluminescent panel, plasma panel, or any other type of display. The computing system 1100 may also include one or more peripheral controllers or interfaces 1105 for one or more peripherals 1106. Examples of peripherals may include one or more printers, scanners, input devices, output devices, sensors, and the like. A communications controller 1114 may interface with one or more communication devices 1115, which enables the system 1100 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1100 comprises one or more fans or fan trays 1118 and a cooling subsystem controller or controllers 1117 that monitors thermal temperature(s) of the system 1100 (or components thereof) and operates the fans/fan trays 1118 to help regulate the temperature.

In the illustrated system, all major system components may connect to a bus 1116, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact disc (CD) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as a CD and holographic devices; magneto-optical media; and hardware devices that are specially configured to store or to store and execute program code, such as ASICs, programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method comprising:
   given a first training data batch comprising captions in a source language and visual features of corresponding images, using the first training data batch as input to train a cross-lingual cross-modal network;
   computing losses for a masked language modeling (MLM) task, a masked region classification (MRC)

task, and a cross-modal text recovery (CMTR) task based upon the first training data batch;

given a second training data batch comprising a set of texts in the source language and a corresponding set of texts in a target language, using the second training data batch as input to train the cross-lingual cross-modal network;

computing losses for a translation language modeling (TLM) task and a cross-lingual text recovery (CLTR) task based upon the second training data batch;

given a third training data batch comprising monolingual text, using the third training data batch as input to train the cross-lingual cross-modal network;

computing losses for a monolingual MLM task based upon the third training data batch;

updating the cross-lingual cross-modal network using the losses for the MLM, MRC, CMTR, TLM, CLTR, and monolingual MLM tasks;

responsive to a stop condition not being reached, repeating the above steps with next first, second, and third training data batches; and responsive to a stop condition being reached, outputting a pretrained cross-lingual cross-modal (CLCM) network.

2. The computer-implemented method of claim 1 wherein:
for the CMTR task, the CLCM network comprises an attention layer to learn alignment between text features and visual features from the first training data batch.

3. The computer-implemented method of claim 1 wherein:
for the CLTR task, the CLCM network comprises an attention mechanism to compute an attended representation for input text in the source language with its corresponding text in the target language.

4. The computer-implemented method of claim 1 wherein:
using finetuning data as input into a CLCM system comprising the pretrained CLCM network, in which, for each text, there is one positive image that is relevant to the text and a remainder of the images are not relevant to the text, and correspondingly, for each image, there is one positive text that is relevant to the image and a remainder of the texts are not relevant to the image;

for each text of a set of texts from the finetuning data, determining a loss comprising a comparison between a relevance output of the CLCM system for the text given its corresponding positive image and a relevance output of the CLCM system for the text given a not relevant image;

for each image of a set of images from the finetuning data, determine a loss comprising a comparison between a relevance output of the CLCM system for the image given its positive text and a relevance output of the CLCM system for the image given a not relevant text;

updating the CLCM system using a final loss based upon a combination of the losses; and outputting a finetuned CLCM system.

5. The computer-implemented method of claim 4 wherein:
the not relevant image produces the worst relevance output given the text; and
the not relevant text produces the worst relevance output given the image.

6. The computer-implemented method of claim 4 wherein:
the texts of the finetuning data comprise one or more non-source languages.

7. The computer-implemented method of claim 4 wherein:
receiving a query text in a non-source language as an input to the finetuned CLCM system;
given the query text and a set of images, obtaining a relevance score for at least some of the images in the set of images relative to the query text using the CLCM system; and
outputting a set of top k images, based upon relevance score, for the query text.

8. The computer-implemented method of claim 4 wherein:
receiving a query image as an input to the finetuned CLCM system;
given the query image and a set of texts in one or more non-source languages, obtaining a relevance score for at least some of the texts in the set of texts relative to the query image using the CLCM system; and
outputting a set of top k texts, based upon relevance score, for the query image.

9. A computer-implemented method comprising:
receiving a query text in a non-source language or a query image as an input to a cross-lingual cross-modal (CLCM) system;
responsive to the input being the query image, performing steps comprising:
given the query image and a set of texts in one or more non-source languages, obtaining a relevance score for at least some of the texts in the set of texts relative to the query image using the CLCM system; and
outputting a set of top k texts, based upon relevance score, for the query image;
responsive to the input being the query text, performing steps comprising:
given the query text and a set of images, obtaining a relevance score for at least some of the images in the set of images relative to the query text using the CLCM system; and
outputting a set of top k images, based upon relevance score, for the query text; and
in which the CLCM system was trained by performing steps comprising:
given a first training data batch comprising captions in a source language and visual features of corresponding images, using the first training data batch as input to train a cross-lingual cross-modal network;
computing losses for a masked language modeling (MLM) task, a masked region classification (MRC) task, and a cross-modal text recovery (CMTR) task based upon the first training data batch;
given a second training data batch comprising a set of texts in the source language and a corresponding set of texts in a target language, using the second training data batch as input to train the cross-lingual cross-modal network;
computing losses for a translation language modeling (TLM) task and a cross-lingual text recovery (CLTR) task based upon the second training data batch;
given a third training data batch comprising monolingual text, using the third training data batch as input to train the cross-lingual cross-modal network;
computing losses for a monolingual MLM task based upon the third training data batch;

updating the cross-lingual cross-modal network using the losses for the MLM, MRC, CMTR, TLM, CLTR, and monolingual MLM tasks;
responsive to a stop condition not being reached, repeating the above steps with next first, second, and third training data batches; and
responsive to a stop condition being reached, outputting a cross-lingual cross-modal (CLCM) network for the CLCM system.

10. The computer-implemented method of claim 9 wherein:
for the CMTR task, the CLCM system comprises an attention layer to learn alignment between text features and visual features from the first training data batch.

11. The computer-implemented method of claim 9 wherein:
for the CLTR task, the CLCM system comprises an attention mechanism to compute an attended representation for input text in the source language with its corresponding text in the target language.

12. The computer-implemented method of claim 9 wherein the CLCM system was trained further trained by performing steps comprising
using finetuning data as input into the CLCM system comprising the CLCM network, in which, for each text, there is one positive image that is relevant to the text and a remainder of the images are not relevant to the text, and correspondingly, for each image, there is one positive text that is relevant to the image and a remainder of the texts are not relevant to the image;
for each text of a set of texts from the finetuning data, determining a loss comprising a comparison between a relevance output of the CLCM system for the text given its corresponding positive image and a relevance output of the CLCM system for the text given a not relevant image;
for each image of a set of images from the finetuning data, determine a loss comprising a comparison between a relevance output of the CLCM system for the image given its positive text and a relevance output of the CLCM system for the image given a not relevant text; and
updating the CLCM system using a final loss based upon a combination of the losses to obtain the CLCM system.

13. The computer-implemented method of claim 12 wherein:
the not relevant image produces the worst relevance output given the text; and
the not relevant text produces the worst relevance output given the image.

14. The computer-implemented method of claim 12 wherein:
the texts of the finetuning data comprise one or more non-source languages.

15. A system comprising:
one or more processors; and
a non-transitory computer-readable medium or media comprising one or more sets of instructions which, when executed by at least one of the one or more processors, causes steps to be performed comprising:
receiving a query text in a non-source language or a query image as an input to a cross-lingual cross-modal (CLCM) system;
responsive to the input being the query image, performing steps comprising:
given the query image and a set of texts in one or more non-source languages, obtaining a relevance score for at least some of the texts in the set of texts relative to the query image using the CLCM system; and
outputting a set of top k texts, based upon relevance score, for the query image;
responsive to the input being the query text, performing steps comprising:
given the query text and a set of images, obtaining a relevance score for at least some of the images in the set of images relative to the query text using the CLCM system; and
outputting a set of top k images, based upon relevance score, for the query text; and
in which the CLCM system was trained by performing steps comprising:
given a first training data batch comprising captions in a source language and visual features of corresponding images, using the first training data batch as input to train a cross-lingual cross-modal network;
computing losses for a masked language modeling (MLM) task, a masked region classification (MRC) task, and a cross-modal text recovery task (CMTR) task based upon the first training data batch;
given a second training data batch comprising a set of texts in the source language and a corresponding set of texts in a target language, using the second training data batch as input to train the cross-lingual cross-modal network;
computing losses for a translation language modeling (TLM) task and a cross-lingual text recovery (CLTR) task based upon the second training data batch;
given a third training data batch comprising monolingual text, using the third training data batch as input to train the cross-lingual cross-modal network;
computing losses for a monolingual MLM task based upon the third training data batch;
updating the cross-lingual cross-modal network using the losses for the MLM, MRC, CMTR, TLM, CLTR, and monolingual MLM tasks;
responsive to a stop condition not being reached, repeating the above steps with next first, second, and third training data batches; and
responsive to a stop condition being reached, outputting a cross-lingual cross-modal (CLCM) network for the CLCM system.

16. The system of claim 15 wherein:
for the CMTR task, the CLCM system comprises an attention layer to learn alignment between text features and visual features from the first training data batch.

17. The system of claim 15 wherein:
for the CLTR task, the CLCM system comprises an attention mechanism to compute an attended representation for input text in the source language with its corresponding text in the target language.

18. The system of claim 15 wherein the CLCM system was further trained by performing steps comprising:
using finetuning data as input into the CLCM system comprising the CLCM network, in which, for each text, there is one positive image that is relevant to the text and a remainder of the images are not relevant to the text, and correspondingly, for each image, there is one positive text that is relevant to the image and a remainder of the texts are not relevant to the image;

for each text of a set of texts from the finetuning data, determining a loss comprising a comparison between a relevance output of the CLCM system for the text given its corresponding positive image and a relevance output of the CLCM system for the text given a not relevant image;

for each image of a set of images from the finetuning data, determine a loss comprising a comparison between a relevance output of the CLCM system for the image given its positive text and a relevance output of the CLCM system for the image given a not relevant text; and updating the CLCM system using a final loss based upon a combination of the losses to obtain the CLCM system.

19. The system of claim 18 wherein:

the not relevant image produces the worst relevance output given the text; and the not relevant text produces the worst relevance output given the image.

20. The system of claim 18 wherein:

the texts of the finetuning data comprise one or more non-source languages.

* * * * *